United States Patent
Kim (10) Patent No.: US 7,505,797 B2
(45) Date of Patent: Mar. 17, 2009

(54) JOYSTICK APPARATUS FOR PORTABLE TERMINAL

(75) Inventor: Duck-Soo Kim, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 518 days.

(21) Appl. No.: 11/393,272

(22) Filed: Mar. 30, 2006

(65) Prior Publication Data
US 2007/0157428 A1    Jul. 12, 2007

(30) Foreign Application Priority Data
Jan. 11, 2006    (KR) ...................... 10-2006-0003293

(51) Int. Cl.
| | |
|---|---|
| H04M 1/00 | (2006.01) |
| A63F 9/24 | (2006.01) |
| A63F 13/00 | (2006.01) |
| G06F 17/00 | (2006.01) |
| G06F 19/00 | (2006.01) |
| G06F 3/033 | (2006.01) |
| G09G 5/08 | (2006.01) |

(52) U.S. Cl. ........................ 455/575.1; 463/37; 463/38; 345/161

(58) Field of Classification Search .............. 455/414.1, 455/575.1, 575.3; 463/36, 37, 38, 46; 700/85, 700/83; 345/156, 157, 158, 161; 379/433.12, 379/433.13; 200/61.1
See application file for complete search history.

(56) References Cited

U.S. PATENT DOCUMENTS 6,549,789 B1 *    4/2003   Kfoury ................... 455/550.1
2002/0147026 A1 * 10/2002   Hsieh ..................... 455/550
2002/0198048 A1 * 12/2002   Wang ..................... 463/37

* cited by examiner

*Primary Examiner*—George Eng
*Assistant Examiner*—Wesley L Kim
(74) *Attorney, Agent, or Firm*—The Farrell Law Firm, PC (57) ABSTRACT

Disclosed is a joystick apparatus for a portable terminal of which a housing can be used as a joystick apparatus. The joystick apparatus includes a first hinge module having a first permanent magnet embedded in the first hinge module, so as to couple the body housing to the folder so that the body housing rotates about the first hinge axis in a lengthwise direction with respect to the folder; a second hinge module having a second permanent magnet embedded in the second hinge module, so as to couple the body housing to the folder so that the body housing rotates about the second hinge axis in a state that the body housing is raised perpendicularly to the folder; a first sensor unit provided to the first hinge module so as to detect a magnetic field of the first permanent magnet and to convert the magnetic field into electrical signals, as the body housing rotates about the first hinge axis with respect to the folder in a lengthwise direction; and a second sensor unit provided to the second hinge module so as to detect a magnetic field of the second permanent magnet and to convert the magnetic field into electrical signals, as the body housing rotates about the second hinge axis with respect to the folder in a clockwise or counterclockwise direction in the state that the body housing is raised perpendicularly to the folder.

19 Claims, 11 Drawing Sheets

JOYSTICK APPARATUS FOR PORTABLE TERMINAL

PRIORITY

This application claims priority to an application entitled "Joystick Apparatus for Portable Terminal" filed with the Korean Intellectual Property Office on Jan. 11, 2006 and assigned Serial No. 2006-3293, the contents of which are incorporated herein by reference.

BACKGROUND OF THE INVENTION

1. Field of the Invention

The present invention relates to a portable communication terminal including a cellular phone, personal digital assistants (PDAs), a TV phone for watching Digital Multimedia Broadcasting (DMB) and the like, and more particularly to a joystick apparatus for a portable terminal of which the housing is used as a part of the joystick apparatus.

2. Description of the Related Art

Generally, the term "terminal" refers to a video cassette player, a camera, a portable communication device, a personal computer, a plasma display panel, and the like.

Here, the "communication device" refers to a device which a user can carry and through which the user can perform wireless communication with another user. Such a portable communication device includes a hand held phone, a second generation cellular phone, a digital phone, a personal communication system phone, and PDAs, which are classified into various types according to its appearance. For example, a wireless terminal is classified into a bar-type wireless terminal, a flip-type wireless terminal or a folder-type wireless terminal according to their appearance. The bar-type wireless terminal refers to a terminal having single bar-type housing. The flip-type wireless terminal refers to a terminal in which a flip or a cover is rotatably connected by a hinge device to a bar-type housing. The folder-type wireless terminal refers to a terminal in which a folder is rotatably connected by a hinge device to single bar-type housing and folded. A conventional terminal is essentially provided with an antenna, a data input unit, a data output unit, and a data transceiver-unit. The data input unit generally includes key buttons which a user can push with his/her fingers to input data. Moreover, a touch pad or a touch screen may be used as the data input unit.

Further, the user can write a message using the key buttons of a portable terminal and send it to another user.

The key buttons include a plurality of key arrays to input data. These key buttons include a send key button used to start the communication, a cancel key button, a clear key, a power key, an end key, numeral keys, character keys, function keys, etc.

Figure 1:
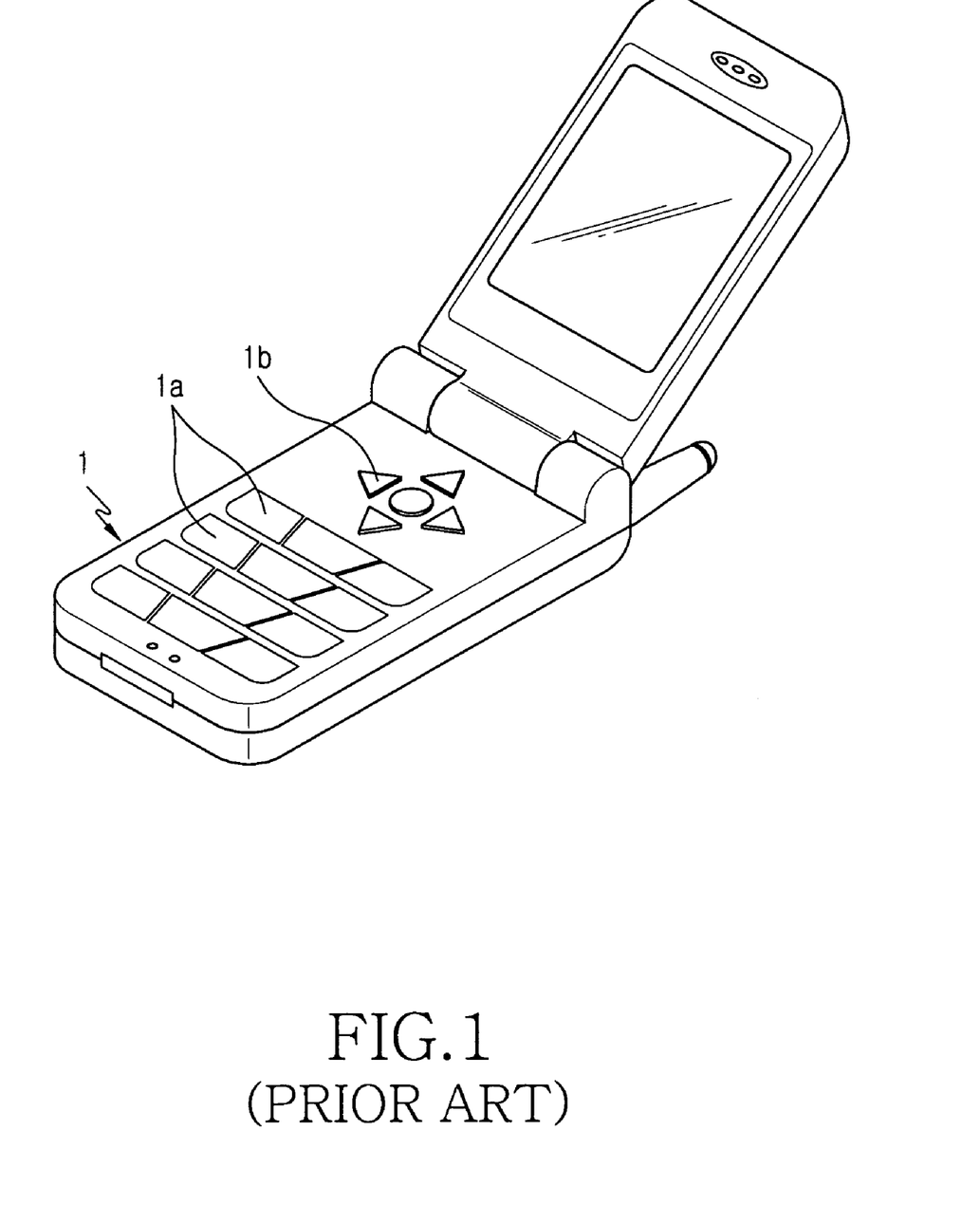
FIG. 1 is a perspective view showing a conventional folder-type portable terminal, in which a folder is open.

As shown in FIG. 1, the key input unit of the portable communication terminal has a keypad 1a and 4-way control keys 1b arranged on a front surface thereof, and a plurality of side keys (not shown) assisting the function of the keypad 1a and playing the role of function keys.

The key input unit is provided with the 4-way control keys 1b to control a movement direction of an activated cursor and to move the cursor in one direction, left, right, upward, and downward directions.

Recently, multifunctional portable communication terminals have come onto the market, to which a MP3 player function, a moving picture player function, and a game function have been added.

The conventional portable communication terminal's key buttons provide adequate means for controlling communication functions but they are inefficient in a case when a user is about to play the game. Using the conventional portable communication terminal, the user inputs direction information into the game program using the keypad 1a and the 4-way control keys 1b, thereby causing the efficiency of the game to degrade due to awkwardness of using the keys.

Figure 2:
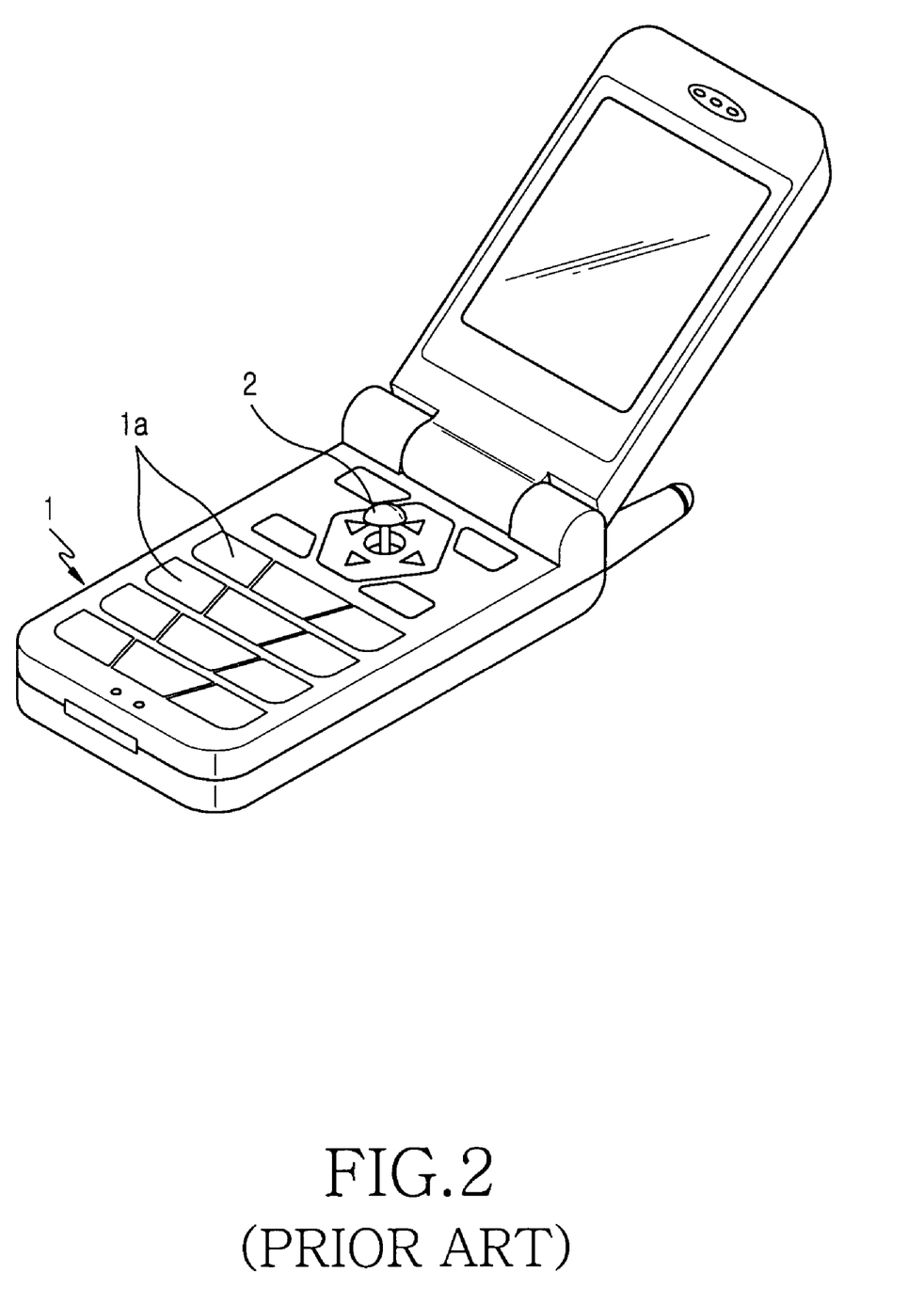
FIG. 2 is a perspective view showing the conventional folder-type portable terminal having a joystick unit.

As shown in FIG. 2, an easily operated joystick unit 2 has been provided to eliminate the problem as described above.

The conventional joystick unit 2 for the portable terminal has been implemented as a small joystick on an upper portion of the keypad of the portable terminal, or has been connected to the portable terminal by means of a separate connector.

However, the conventional joystick unit embedded in the portable terminal is too small, which makes it is difficult to use. In addition, it is inconvenient for a user to carry the conventional joystick unit connected to the portable terminal by a separate connector.

SUMMARY OF THE INVENTION

Accordingly, the present invention has been made to solve the above-mentioned problems occurring in the prior art, and an object of the present invention is to provide a joystick apparatus for a folder-type portable terminal of which a housing is used for the joystick, which can assist a key input to easily operate in the portable terminal.

To achieve the object of the present invention, there is provided a joystick apparatus for a folder type portable terminal which has a body housing provided in a lengthwise direction, and a folder rotatably coupled to the body housing, which includes: a first hinge module having a first permanent magnet embedded in the first hinge module, so as to couple the body housing to the folder so that the body housing rotates about the first hinge axis in a lengthwise direction with respect to the folder; a second hinge module having a second permanent magnet embedded in the second hinge module, so as to couple the body housing to the folder so that the body housing rotates about the second hinge axis in a state that the body housing is raised perpendicularly to the folder; a first sensor unit provided to the first hinge module so as to detect a magnetic field of the first permanent magnet and to convert the magnetic field into electrical signals, as the body housing rotates about the first hinge axis with respect to the folder in a lengthwise direction; and a second sensor unit provided to the second hinge module so as to detect a magnetic field of the second permanent magnet and to convert the magnetic field into electrical signals, as the body housing rotates about the second hinge axis with respect to the folder in a clockwise or counterclockwise direction in the state that the body housing is raised perpendicularly to the folder.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE PREFERRED EMBODIMENT

Hereinafter, the preferred embodiment of the present invention will be described in detail with reference to the accompanying drawings.

Figure 3:
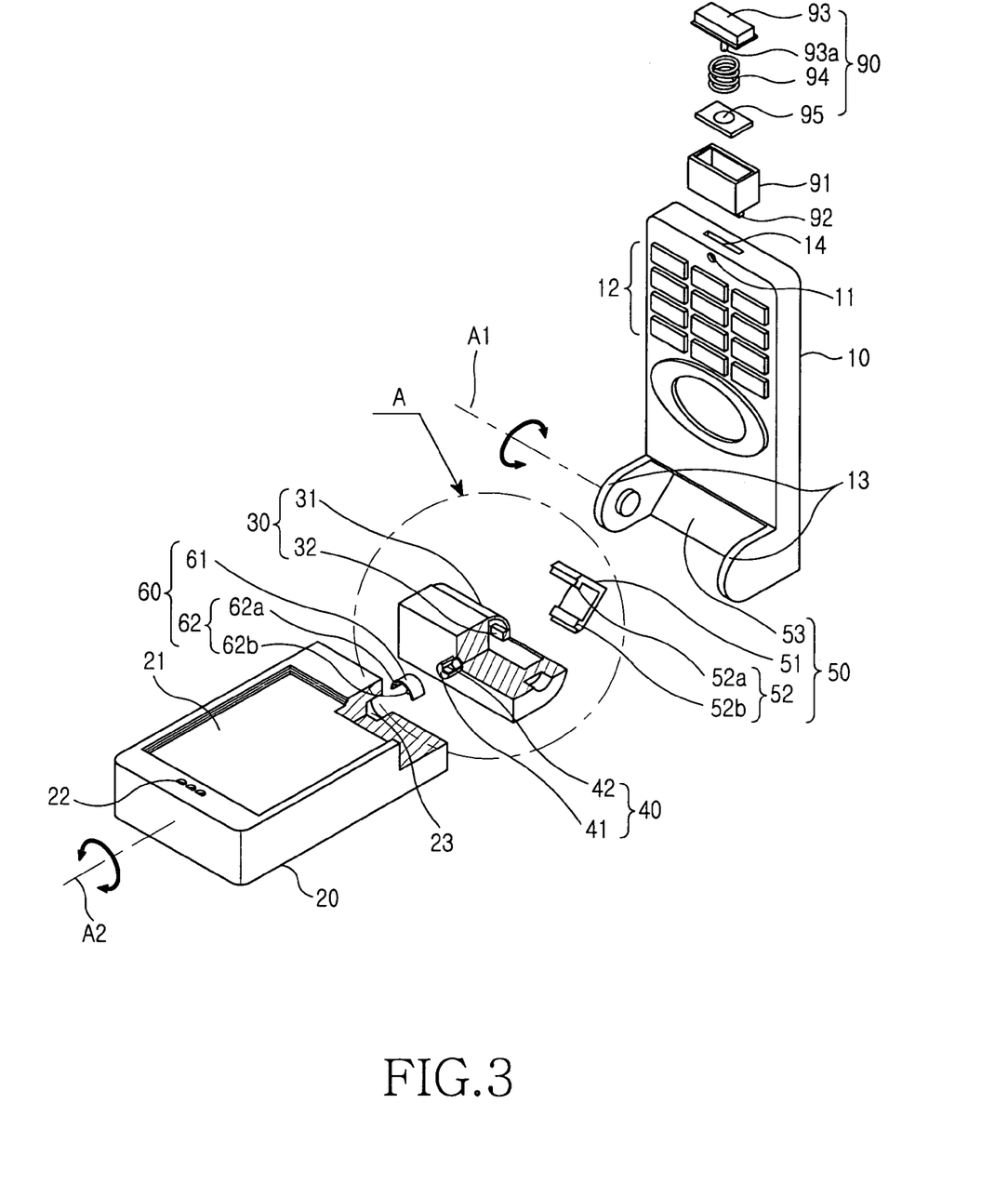
FIG. 3 is an exploded perspective view showing a joystick apparatus for a portable terminal according to the present invention.

As shown in FIG. 3, a folder-type portable terminal includes a body housing 10 provided in a longitudinal direction and having a microphone unit 11 and a keypad unit 12, and a folder 20 having a liquid crystal display unit 21 and a speaker unit 22.

Figure 4:
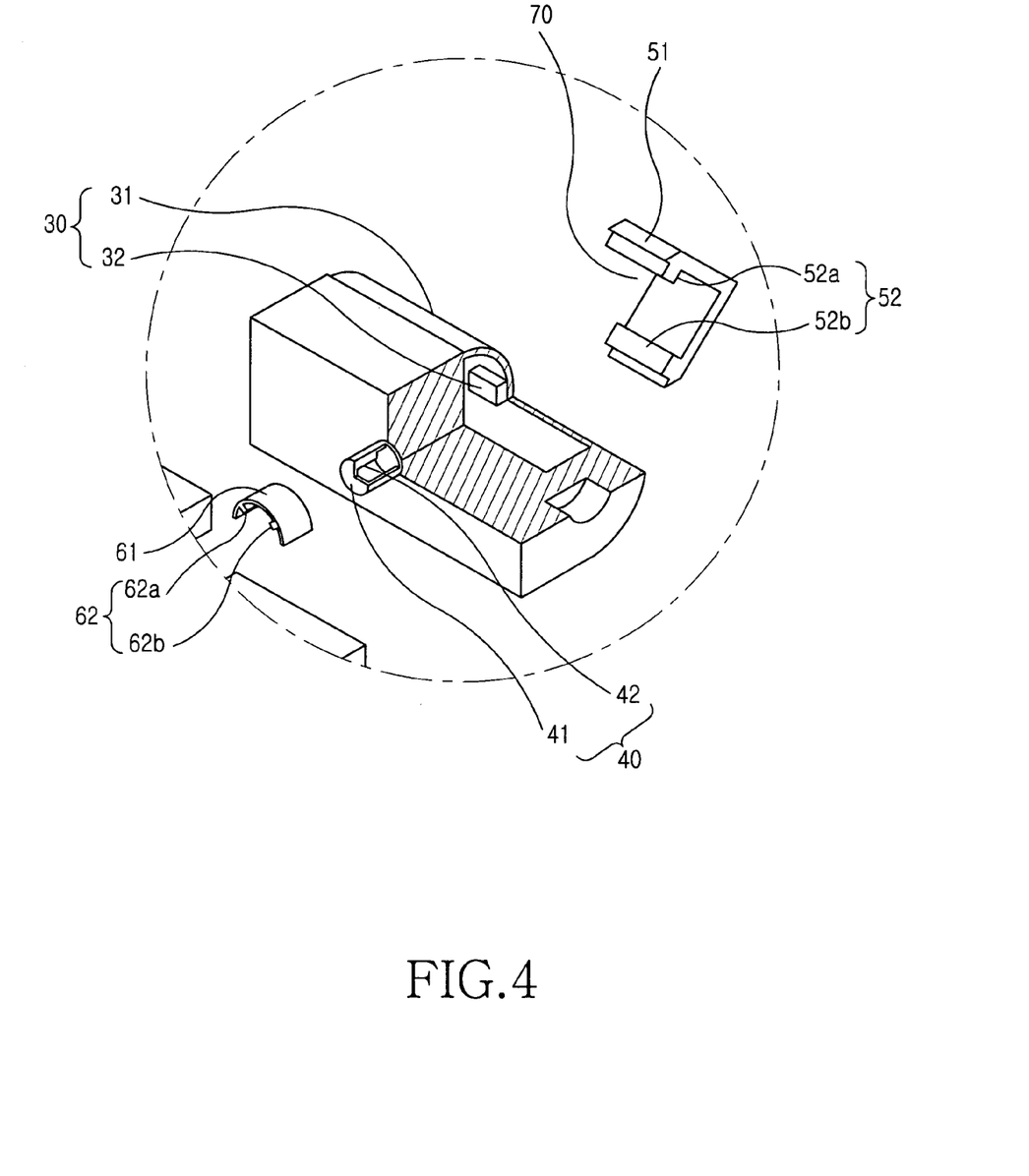
FIG. 4 is an enlarged and exploded perspective view showing the joystick apparatus for a portable terminal, marked by the circle A of FIG. 3.

As shown in FIGS. 3 and 4, the joystick apparatus of the folder-type portable terminal includes first and second hinge modules 30 and 40, and first and second sensor units 50 and 60. The first hinge module 30 has a first permanent magnet 32 to correspond to the first sensor unit 50 as described below, which is provided to one end of the body housing 10 so as to couple the body housing 10 to the folder 20 so that the body housing 10 can rotate lengthwise about a first hinge axis A1. The second hinge module 40 has a second permanent magnet 42 to correspond to the second sensor unit 60 as described below, which is disposed between the folder 20 and the first hinge module 30 so as to couple the body housing 10 to the folder 20 so that the body housing 10 is raised perpendicularly to the folder 20 in the lengthwise direction and rotates about a second hinge axis A2. The first sensor unit 50 is provided in the first hinge module 30, which detects the magnetic field of the first permanent magnet 32 and converts the magnetic field into electrical signals and applies these signals to a control unit (not shown) of the portable terminal as the body housing 10 rotates with respect to the folder 20 and raises perpendicular to the folder 20 so as to reciprocally rotate about the first hinge axis A1 in the lengthwise direction. The second sensor unit 60 is provided in the second hinge module 40, which detects magnetic field of the second permanent magnet 42 and converts the magnetic field into electrical signals so as to apply these signals to the control unit of the portable terminal as the body housing 10 is raised perpendicular to the folder 20 in the lengthwise direction and rotates about the second hinge axis A2 in left and right directions.

Figure 5:
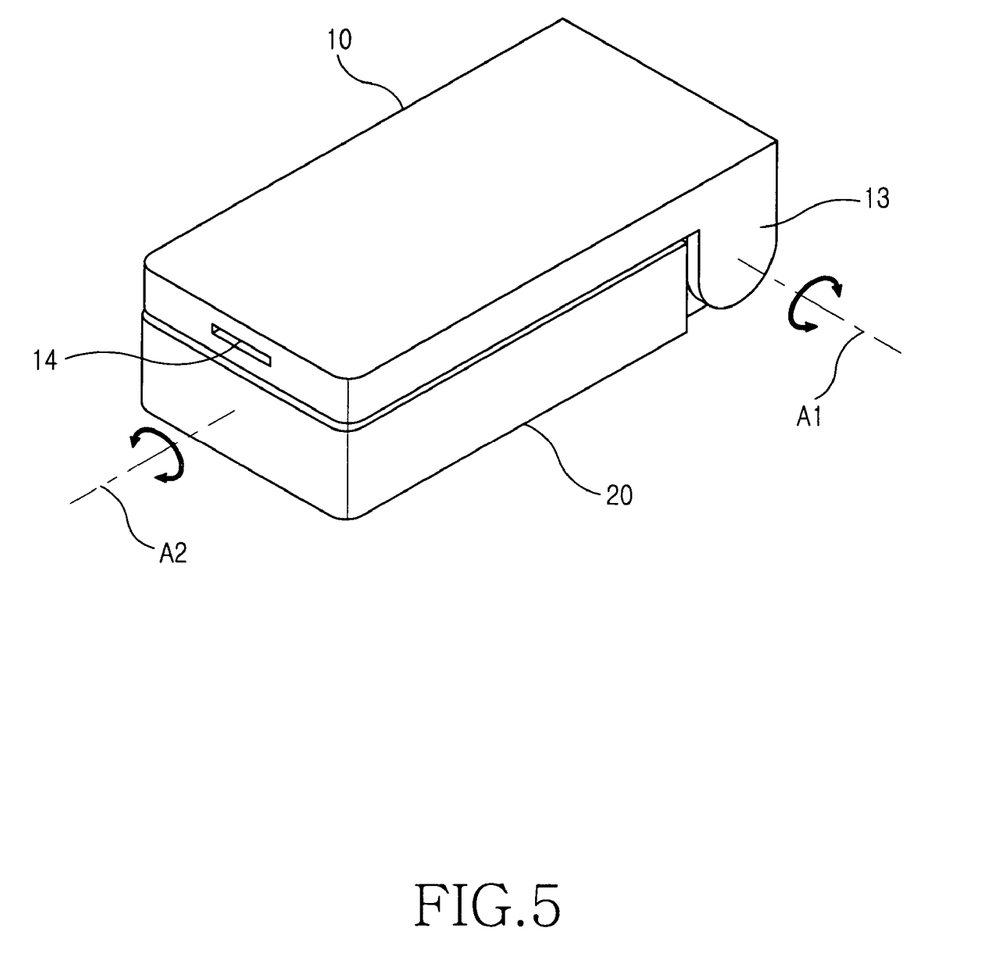
FIG. 5 is a perspective view showing the portable terminal having the joystick apparatus according to the present invention, in which the joystick is not operated.
Figure 6:
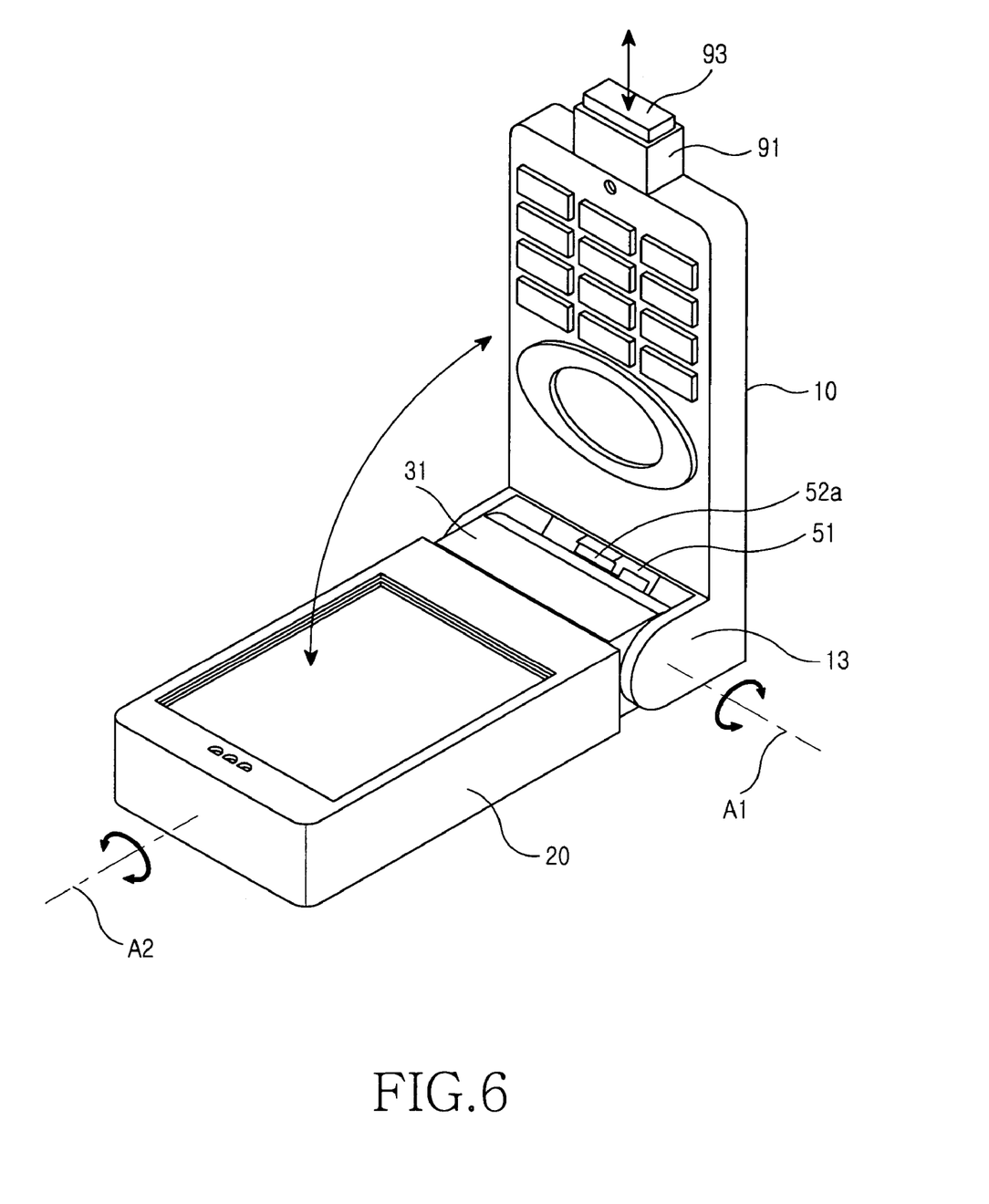
FIG. 6 is a perspective view showing the portable terminal having the joystick apparatus according to the present invention, in which a housing of a body of the portable terminal is rotated with respect to the folder.

As shown in FIGS. 3, 5 and 6, the first hinge module 30 has the first hinge axis A1 about which the body housing 10 can rotate in the lengthwise direction, which includes a center hinge arm 31 disposed between a pair of side hinge arms 13 formed at one end of the body housing 10 and coupled to the body housing 10 so as to rotate about the first hinge axis A1, and the first permanent magnet 32 is embedded in the center hinge arm 31 so as to correspond to the first sensor unit 50.

As shown in FIG. 4, the second hinge module 40 has the second hinge axis A2 about which the body housing 10 can rotate in the vertically raised state, which includes a hinge member 41 inserted in a hinge recess 23 formed at one end of the folder 20 so as to rotate about the second hinge axis A2, and the second permanent magnet 42 is embedded in the hinge member 41 so as to correspond to the second sensor unit 60.

As shown in FIGS. 3, 6, 7 and 8, the first sensor unit 50 includes a first flexible sensor circuit 51 and a flexible circuit support 53. The first flexible sensor circuit 51 has a pair of body-side Hall ICs 52a and 52b to detect the magnetic field of the first permanent magnet 32 of the first hinge module 30, which is disposed at the one end of the body housing 10. The flexible circuit support 53 is formed at the one end of the body housing 10 to support the first flexible sensor circuit 51 so that the first flexible sensor circuit 51 corresponds to the first permanent magnet 32.

As shown in FIG. 4, the first flexible sensor circuit 51 has a shape of a rotated character V, of which the body-side Hall ICs 52a and 52b are symmetric with respect to the magnet 32 and correspond to the first permanent magnet 32. A first magnetic space 70 is defined between the body-side Hall ICs 52a and 52b and the first permanent magnet 32 so that the body-side Hall ICs 52a and 52b rotate along with the body housing 10 and take the magnetic field of the first permanent magnet 32 as the body housing 10 rotates about the first hinge axis A1.

Figure 7:
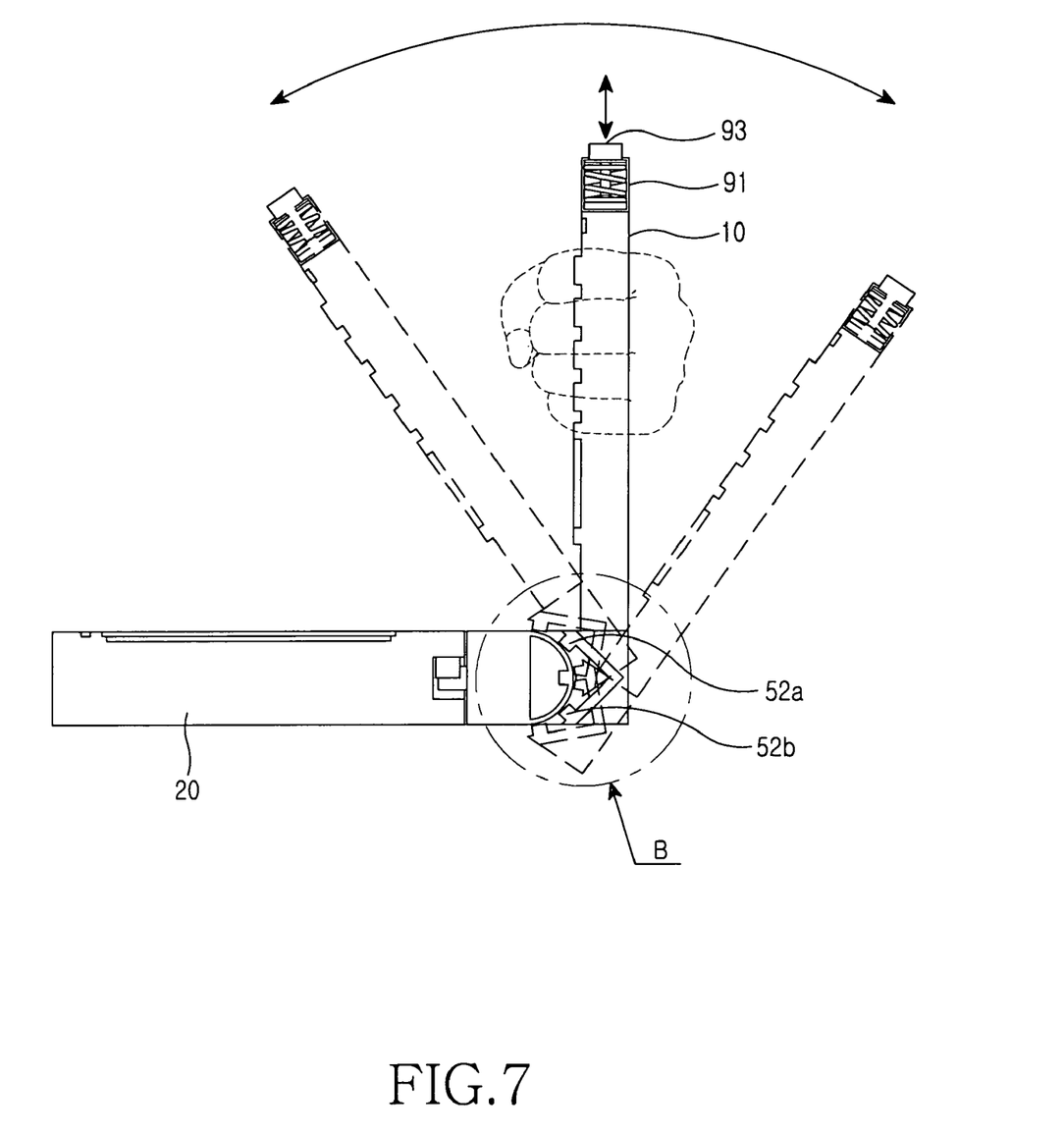
FIG. 7 is a side view showing the portable terminal having the joystick apparatus according to the present invention, in which the housing of the body of the portable terminal is rotated about a first hinge axis with respect to the folder.
Figure 8:
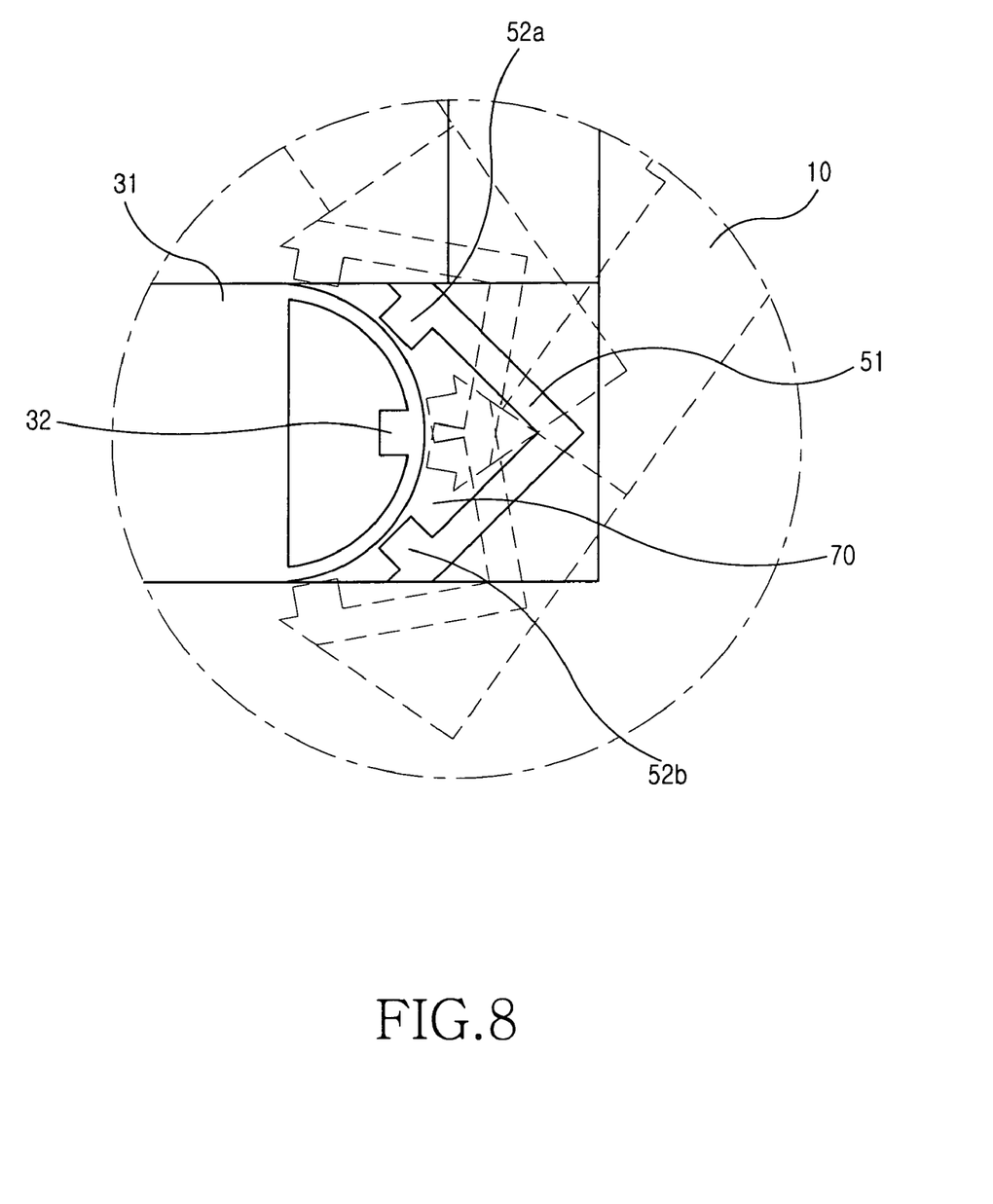
FIG. 8 is an enlarged side view showing the portable terminal having the joystick apparatus according to the present invention, marked by the circle B in FIG. 7.

As shown in FIGS. 7 and 8, the body-side Hall ICs 52 include first and second Hall ICs 52a and 52b. The first Hall IC 52a is attached to one end of the first flexible sensor circuit 51, which rotates together to detect the magnetic field of the first permanent magnet 32 when the body housing 10 rotates about the first hinge axis A1 in the lengthwise direction so as to be away from the folder 20. On the other hand, the second Hall IC 52b is attached to the other end of the first flexible sensor circuit 51, which rotates together to detect the magnetic field of the first permanent magnet 32 when the body housing 10 rotates about the first hinge axis A1 in the reversed lengthwise direction so as to approach the folder 20.

As shown in FIGS. 3, 9, 10, and 11, the second sensor unit 60 is disposed in the folder 20, which includes a second flexible sensor unit 61 having a pair of folder-side Hall ICs 62a and 62b to detect the magnetic field of the second permanent magnet 42 of the second hinge module 40. The second flexible sensor circuit 61 is mounted in a hinge recess 23 formed in the folder 20 so as to correspond to the second permanent magnet 42 in the second hinge member 41.

Figure 11:
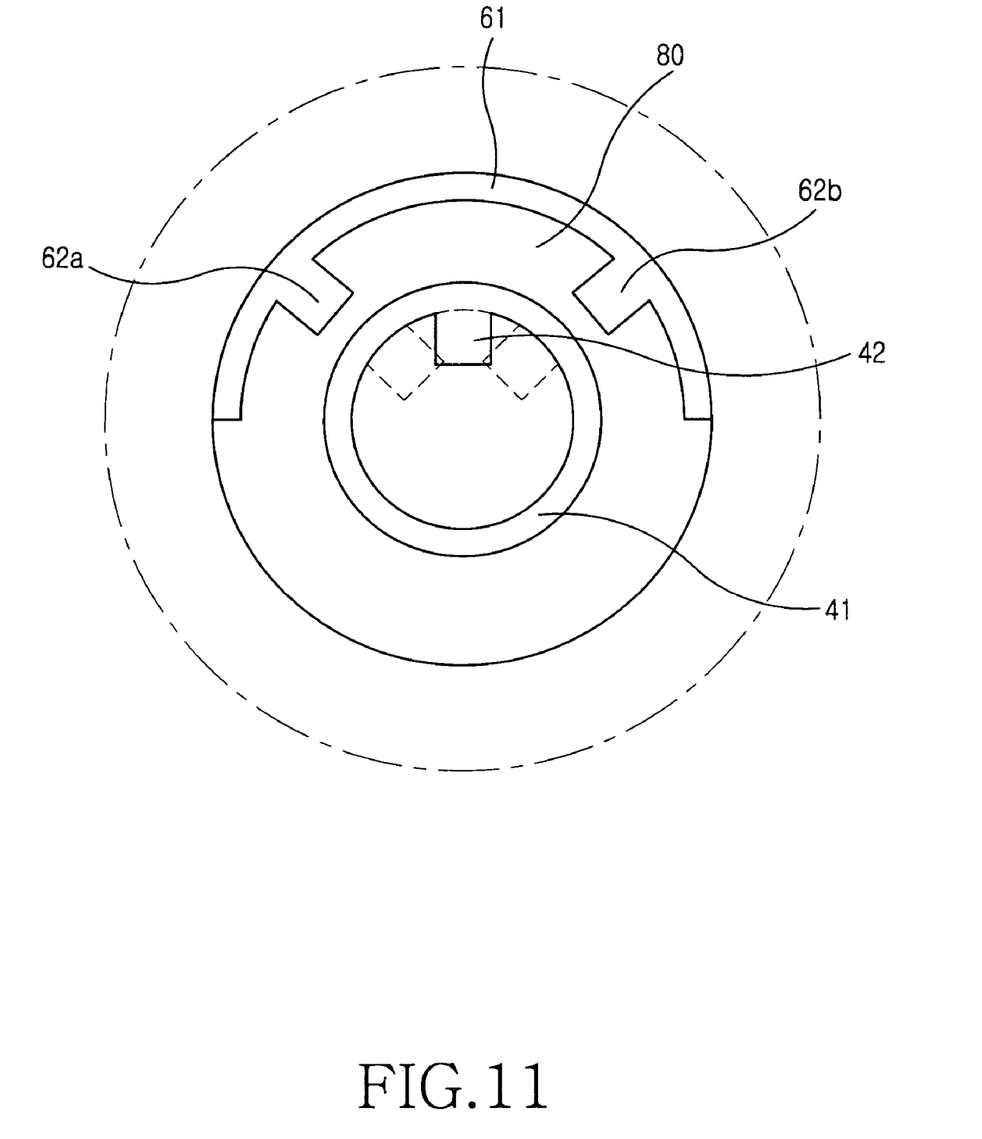
FIG. 11 is an enlarged view of a portion of the portable terminal having the joystick apparatus, marked by the circle C in FIG. 10.

As shown in FIG. 11, the second flexible sensor circuit 61 has a hemispherical shape, and the folder-side Hall ICs 62 are symmetric with respect to the second permanent magnet 42 so as to correspond to the second permanent magnet 42. A second magnetic space 70 is defined between the folder-side Hall ICs 62 and the second permanent magnet 42 so that the folder-side Hall ICs 62 rotate along with the body housing 10 and take the magnetic field of the second permanent magnet 42 as the body housing 10 rotates about the second hinge axis A2.

Figure 10:
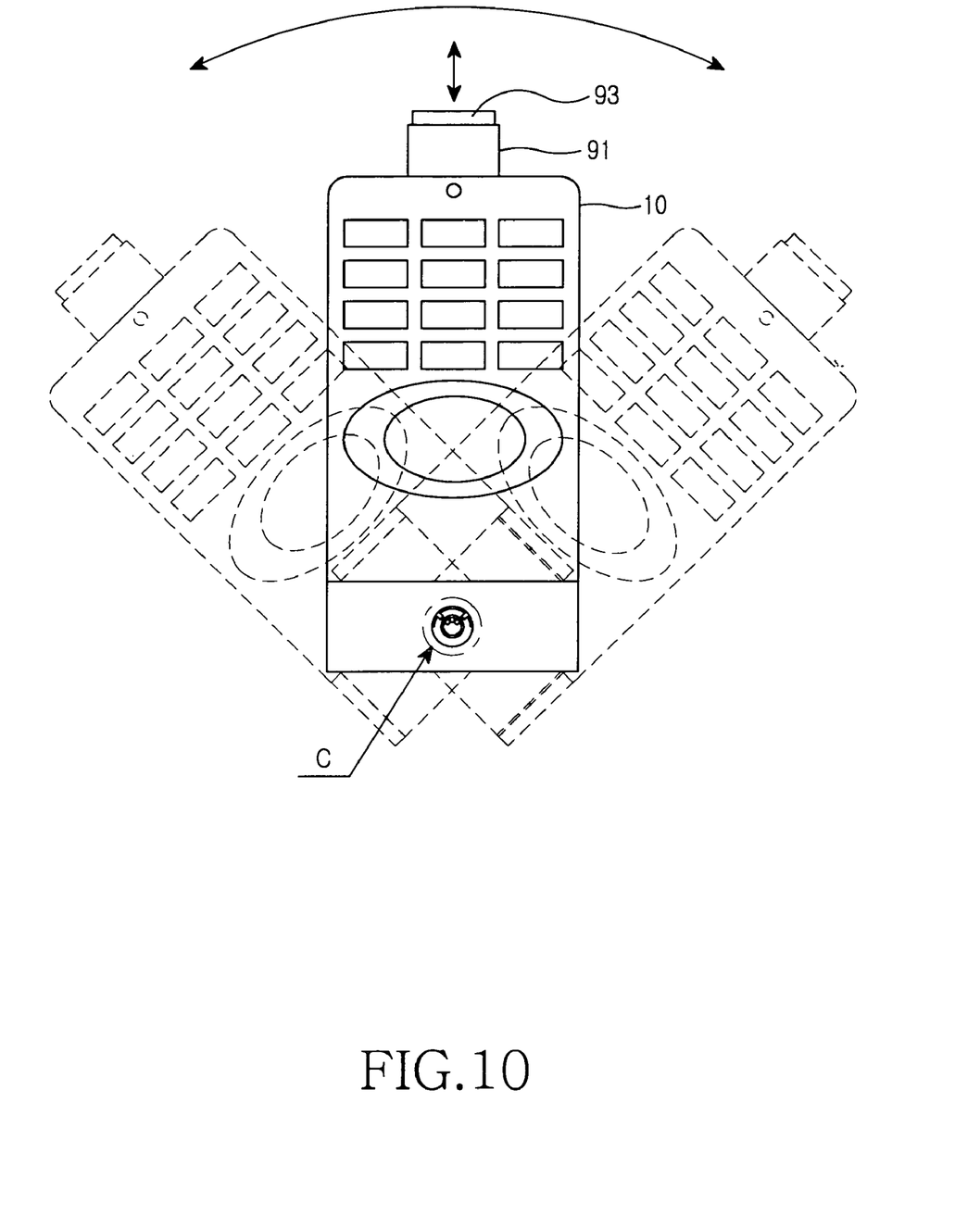
FIG. 10 is a front view of the portable terminal having the joystick apparatus according to the present invention, in which the housing of the body of the portable terminal is rotated with respect to the folder and then rotated about the second hinge axis.

As shown in FIGS. 10 and 11, the folder-side Hall ICs 62 include first and second Hall ICs 62a and 62b. The first Hall IC 62a is attached to one end of the second flexible sensor circuit 61 so as to detect the rotation of the second permanent magnet 42 when the body housing 10 rotates counterclockwise about the second hinge axis A2 when of being raised perpendicularly to the folder 20 and the second permanent magnet 42 also rotates along with the body housing 10. The second Hall IC 62b is attached to the other end of the second flexible sensor circuit 61 so as to detect the rotation of the second permanent magnet 42 when the body housing 10 rotates clockwise about the second hinge axis A2 when of raising perpendicular to the folder 20 and the second permanent magnet 42 also rotates along with the body housing 10.

As shown in FIG. 7, the body housing 10 rotates by 90 degrees with respect to the folder 20 so as to be raised.

As shown in FIGS. 3 and 7, a button assembly 90 is detachably coupled to the other end of the body housing 10, which is electrically connected to an interface connector 14 provided in the body housing 10 when coupled to the body housing 10.

As shown in FIG. 3, the button assembly 90 includes a button housing 91, a connection terminal 92, a button member 93, a resilient member 94, and a dome switch 95. The button housing 91 receives the connection terminal 92, the button member 93, the resilient member 94, and the dome switch 95 which are sequentially assembled. The connection terminal 92 is formed at one end of the button housing 91, which is electrically connected to the interface connector 14 when the button assembly 90 is attached to the body housing 10. The button member 93 is located at one end of the button housing 91 and exposed to the outside, and is introduced into and withdrawn from the button housing 91 when a user pushes the button member 93. The resilient member 94 is located in the button housing 91 and provides a resilient force to the button member 93 so that the button member 93 is introduced into and withdrawn from the button housing 91 when the user pushes the button assembly 90. The dome switch 95 is placed below the button member 93, which converts the operation of the button member 93 into electrical signals and applies these signals to the control unit of the portable terminal through the connection terminal 92.

The button member 93 has a connection rod 93a formed on a lower surface thereof so as to come into contact with the dome switch 95.

Hereinafter, the operation of the joystick apparatus of the portable terminal according to the present invention having the structure described above will be described in detail with reference to FIGS. 3 through 11.

As shown in FIGS. 3 and 4, the joystick apparatus of the portable terminal includes the body housing 10, the folder 20, the first and second hinge modules 30 and 40, and the first and second sensor units 50 and 60.

As shown in FIGS. 5 and 6, the first hinge module 30 is rotatably coupled to the one end of the first hinge module 30. The pair of side hinge arms 13 are formed at the one end of the body housing 10. The center hinge arm 31 of the first hinge module 30 is coupled between the side hinge arms 13 to the body housing 10 so as to rotate about the first hinge axis A1. The center hinge arm 31 has the first permanent magnet 32 embedded therein to correspond to the first sensor unit 50. The flexible circuit support 53 is disposed between the pair of the side hinge arms 13 so as to support the first flexible sensor circuit 51 of the first sensor unit 50.

As shown in FIG. 5, the first flexible sensor circuit 51 is rotatably coupled to the flexible circuit support 53, while the center hinge arm 31 having the first permanent magnet 32 is rotatably coupled to the pair of side hinge arms 13 over the first flexible sensor circuit 51. The first flexible sensor circuit 51 is provided with the pair of body-side Hall ICs 52 to detect the magnetic field as the first permanent magnet 32 rotates.

As shown in FIG. 3, a hinge recess 23 formed at the one end of the folder 20 receives the second flexible sensor circuit 61 of the second sensor unit 60.

As shown in FIG. 6, the first hinge module 30 provides the second hinge axis A1. The second hinge module 40 allows the body housing 10 to rotate about the second hinge axis A1 in the state that the body housing 10 is raised perpendicularly to the folder 20 in the lengthwise direction.

The second hinge module 40 is provided with the hinge member 41 which has the second permanent magnet 42 embedded therein, so that the hinge member 41 is rotatably inserted into the hinge recess 23 of the folder 20.

The second flexible sensor circuit 61 is provided with the pair of the folder-side Hall ICs 62 for detecting the magnet field as the second permanent magnet 42 rotates.

In this state, as shown in FIGS. 7 and 8, in a case where a user performs a game function using the portable terminal, the user rotates the body housing 10 about the first hinge axis A1 so as to open the body housing 10 from the folder 20.

At this time, as shown in FIG. 7, the body housing 10 is raised perpendicularly to the folder 20 with respect to the first hinge axis A1. Then, the connection terminal of the button assembly 90 is coupled to and electrically connected the interface connector 14 provided to the body housing 10. Here, when the button assembly 90 is not used, the connection terminal 92 is detached from the interface connector 14.

As shown in FIG. 7, in a case where the user moves the activated cursor upward and downward in the liquid crystal display 21 of the folder 20, the user grips the body housing 10 with his/her hand and rotates the body housing 10 about the first hinge axis A1 in the lengthwise direction of the body housing 10.

As shown in FIG. 8, when the body housing 10 rotates upwardly, the first hinge module 30 rotates along with the body housing 10. The first hinge module 30 and the body-side Hall ICs 52 are also rotated together with the body housing 10.

When the body housing 10 rotates upwardly in the clockwise direction, the first Hall IC 52a simultaneously rotates together with the body housing 10 so as to detect the magnetic field of the first permanent magnet 32. Then, the first Hall IC 52a converts the magnetic field into electrical signals and applies these signals to the control unit (not shown) of the portable terminal.

Here, when the body housing 10 is downwardly rotated about the first hinge axis A1 in the counterclockwise direction, the second Hall IC 52b rotates together with the body housing 10. Then, the second Hall IC 52b detects the magnetic field of the first permanent magnet 32 and converts the magnetic field into electrical signals. Next, the second Hall IC 52b applies these signals to the control unit (not shown) of the portable terminal.

The first magnetic space 70 is defined between the first and second Hall ICs 52a and 52b and the first permanent magnet 32. The first magnetic space 70 allows the first and second Hall ICs 52a and 52b to rotate along with the body housing 10 so as to receive the magnetic field of the first permanent magnet 32, as the body housing 10 rotates about the first hinge axis A1.

In this state, as shown in FIG. 7, when the user pushes the button assembly 90 with his/her thumb, the button member 93 moves in a direction that the user pushes the button assembly 90, and presses the dome switch 95. Then, the dome switch 95 converts the pressure of the button member 93 into electrical signals and applies these signals to the control unit of the portable terminal (not shown).

The resilient member 94 is provided in the housing 91 of the button assembly 90, and provides the resilient force to the button member 93 in order to introduce and withdraw the button member 93 in the housing 91 while the button member 93 is pushed.

At this time, since the button member 93 has the contact rod 93a at a lower portion thereof to come into contact with the dome switch 95, the contact rod 93a is pressed to push the dome switch 95 when the button member 93 is pushed.

Figure 9:
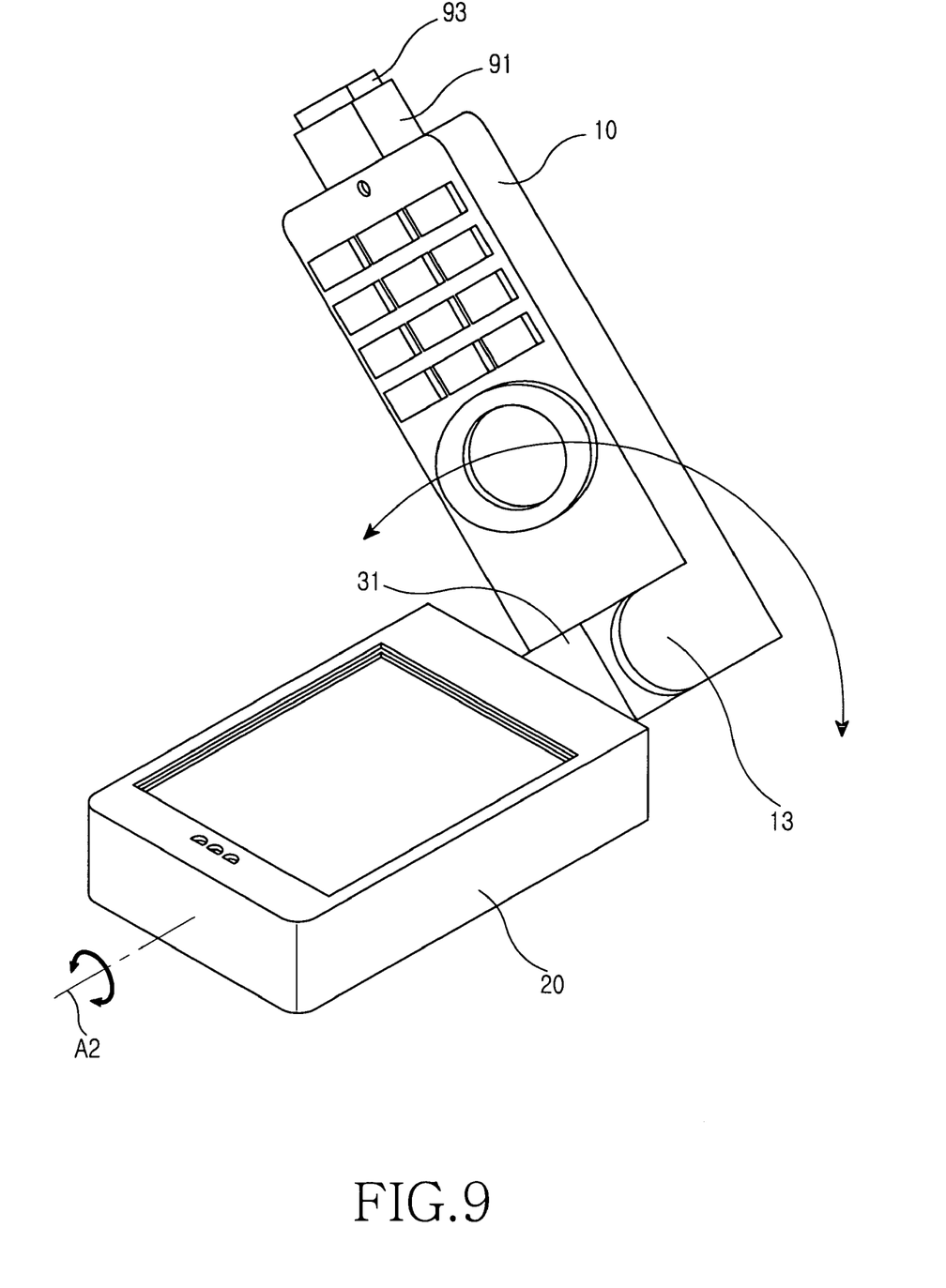
FIG. 9 is a perspective view showing the portable terminal having the joystick apparatus according to the present invention, in which the housing of the body of the portable terminal is rotated with respect to the folder and then rotated about a second hinge axis.

As shown in FIGS. 9, 10 and 11, in a case where the user intends to move the active cursor right or left in the liquid crystal display unit 21 of the folder 20, the body housing 10 must be rotated about the second hinge axis A2 in the clockwise or counterclockwise direction when being raised perpendicular to the folder 20. At this time, the first hinge module 30 rotates together with the body housing 10 and the hinge member 41 provided to the center hinge module 31 of the first hinge module also rotates. In addition, the second permanent magnet 42 provided in the hinge member 41 also rotates along with the body housing 10.

As shown in FIGS. 10 and 11, when the body housing 10 rotates in the counterclockwise direction, the second permanent magnet 42 also rotates along with the body housing 10 in the counterclockwise direction so as to provide the magnetic field to the first Hall IC 62a so that the first Hall IC 62a detects the magnetic field. The first Hall ICs 62a applies the detected signals to the control unit (not shown) of the portable terminal.

Meanwhile, when the body housing 10 rotates in the clockwise direction, the second permanent magnet 42 also rotates along with the body housing 10 in the clockwise direction so as to provide the magnetic field to the second Hall IC 62b so that the second Hall IC 62b detects the magnetic field. Similarly, the second Hall IC 62b applies the detected signals to the control unit (not shown) of the portable terminal. The first and second Hall ICs 62a and 62b are symmetrically disposed with respect to the second permanent magnet 42.

The second magnetic space 80 is defined between the first and second Hall ICs 62a and 62b and the second permanent magnet 42. The second magnetic space 80 allows the second permanent magnet to rotate along with the body housing 10 so as to provide the magnetic field to the first and second Hall ICs 62a and 62b as the body housing 10 rotates about the second hinge axis.

At this time, when the button member 93 of the button assembly 90 is pushed, the dome switch 95 converts the pressure of the button member 93 into electrical signals and applies these signals to the control unit (not shown) of the portable terminal.

As described above, in the folder type portable terminal, the body housing 10 is used as the joystick apparatus, thereby easily performing the key input operation during the use of the game function of the portable terminal and improving the usage of the portable terminal.

While the invention has been shown and described with reference to the preferred embodiments thereof, it will be understood by those skilled in the art that various changes in form and details may be made therein without departing from the spirit and scope of the invention as defined by the appended claims.

What is claimed is:

1. A joystick apparatus for a folder type portable terminal, which has a body housing provided in a lengthwise direction, and a folder rotatably coupled to the body housing, the joystick apparatus comprising:

a first hinge module having a first embedded permanent magnet to couple the body housing to the folder so that the body housing rotates about the first hinge axis in a lengthwise direction with respect to the folder;

a second hinge module having a second embedded permanent magnet to couple the body housing to the folder so that the body housing rotates about the second hinge axis when the body housing is raised perpendicularly to the folder;

a first sensor unit provided on the first hinge module so as to detect a magnetic field of the first permanent magnet and to convert the magnetic field into electrical signals, as the body housing rotates about the first hinge axis with respect to the folder in a lengthwise direction; and a second sensor unit provided on the second hinge module so as to detect a magnetic field of the second permanent magnet and to convert the magnetic field into electrical signals, as the body housing rotates about the second hinge axis with respect to the folder in a clockwise or counterclockwise direction when the body housing is raised perpendicularly to the folder.

2. The joystick apparatus for a portable terminal as claimed as claim 1, wherein the first hinge module provides the first hinge axis, and includes a center hinge arm coupled to the body housing between a pair of side hinge arms provided on one end of the body housing so as to rotate about the first hinge axis, the center hinge arm including the first embedded permanent magnet, the second hinge module providing the second hinge axis and including a hinge member inserted into a hinge recess so as to rotate about the second hinge axis, the second permanent magnet being embedded in the hinge member.

3. The joystick apparatus for a portable terminal as claimed in claim 1, wherein the first sensor unit includes:

a first flexible sensor circuit provided on one end of the body housing and having a pair of body-side Hall ICs to detect the magnetic field of the first permanent magnet of the first hinge module; and a flexible circuit support mounted on the body housing so as to support the first flexible sensor circuit.

4. The joystick apparatus for a portable terminal as claimed in claim 3, wherein the first flexible sensor circuit is mounted on the flexible circuit support and located at a position corresponding to the first permanent magnet.

5. The joystick apparatus for a portable terminal as claimed in claim 3, wherein the first flexible sensor circuit has a rotated character V shape.

6. The joystick apparatus for a portable terminal as claimed in claim 3, wherein the body-side Hall ICs are symmetrically disposed with respect to the first permanent magnet.

7. The joystick apparatus for a portable terminal as claimed in claim 3, wherein a first magnetic space is defined between the body-side Hall ICs and the first permanent magnet so that the body-side Hall ICs rotate along with the body housing so as to detect the magnetic field of the first permanent magnet, as the body housing rotates about the first hinge axis.

8. The joystick apparatus for a portable terminal as claimed in claim 3, wherein the body-side Hall ICs include:

a first Hall IC rotating along with the body housing so as to detect the magnetic field of the first permanent magnet when the body housing rotates about the first hinge axis upward and lengthwise so as to be away from the folder; and a second Hall IC rotating along with the body housing so as to detect the magnetic field of the first permanent magnet when the body housing rotates about the first hinge axis downward so as to approach the folder.

9. The joystick apparatus for a portable terminal as claimed in claim 1, wherein the second sensor unit includes a second flexible sensor circuit which is provided on the folder and having a pair of folder-side Hall ICs to detect the magnetic field of the second permanent magnet of the second hinge module.

10. The joystick apparatus for a portable terminal as claimed in claim 9, wherein the second flexible sensor circuit is inserted into a hinge recess formed in the folder, and provided at a position corresponding to the second permanent magnet of the hinge member.

11. The joystick apparatus for a portable terminal as claimed in claim 9, wherein the second flexible sensor circuit has a hemispherical shape.

12. The joystick apparatus for a portable terminal as claimed in claim 9, wherein the folder-side Hall ICs are symmetrically disposed with respect to the second permanent magnet.

13. The joystick apparatus for a portable terminal as claimed in claim 9, wherein a second magnetic space is defined between the folder-side Hall ICs and the second permanent magnet so that the second permanent magnet rotates along with the body housing so as to provide the magnetic field to the folder-side Hall ICs, as the body housing rotates about the second hinge axis.

14. The joystick apparatus for a portable terminal as claimed in claim 9, wherein the folder-side Hall ICs include:
    a first Hall IC detecting the rotation of the second permanent magnet when the body housing rotates to the left about the second hinge axis when the body housing is raised perpendicular to the folder, and the second permanent magnet rotates along with the body housing; and
    a second Hall IC detecting the rotation of the second permanent magnet when the body housing rotates to the right about the second hinge axis when the body housing is raised perpendicular to the folder, and the second permanent magnet rotates along with the body housing.

15. The joystick apparatus for a portable terminal as claimed in claim 1, wherein the body housing is raised by 90 degrees from the folder.

16. The joystick apparatus for a portable terminal as claimed in claim 1, further comprising a button assembly detachably coupled to the other end of the body housing and electrically connected to an interface connector provided in the body housing when the button assembly is coupled to the body housing.

17. The joystick apparatus for a portable terminal as claimed in claim 16, wherein the button assembly includes:
    a button housing;
    a connection terminal provided to one end of the button housing and electrically connected to the interface connector;
    a button member provided to the other end of the button housing and exposed to outside, the button member being introduced into and withdrawn from the button housing in a direction that the button member is pushed;
    a resilient member provided to the button housing and supplying resilient force to the button member so that the button member can be introduced into and withdrawn from the button housing as the button member is pushed; and
    a dome switch provided on a lower portion of the button member, which converts a pushing operation of the button member into electrical signals so as to apply the signals to a control unit of the portable terminal through the connection terminal.

18. The joystick apparatus for a portable terminal as claimed in claim 17, wherein the button member further includes a contact rod formed on the lower portion of the button member so as to contact the dome switch.

19. A joystick apparatus for a folder-type portable terminal having a body housing provided in a lengthwise direction, and a folder rotatably coupled to the body housing, the joystick apparatus comprising:
    a hinge module having a permanent magnet embedded therein, so as to couple the body housing to the folder so that the body housing is rotated about the folder in the lengthwise direction and raised perpendicularly to the folder; and
    a sensor unit provided on the hinge module so as to detect a magnetic field of the permanent magnet and convert the magnetic field into electrical signals, as the body housing is rotated about the folder in the lengthwise direction and raised perpendicularly to the folder.

* * * * *